N. Adams,
Brick Mold,
N° 376, Patented Sept. 8, 1837.
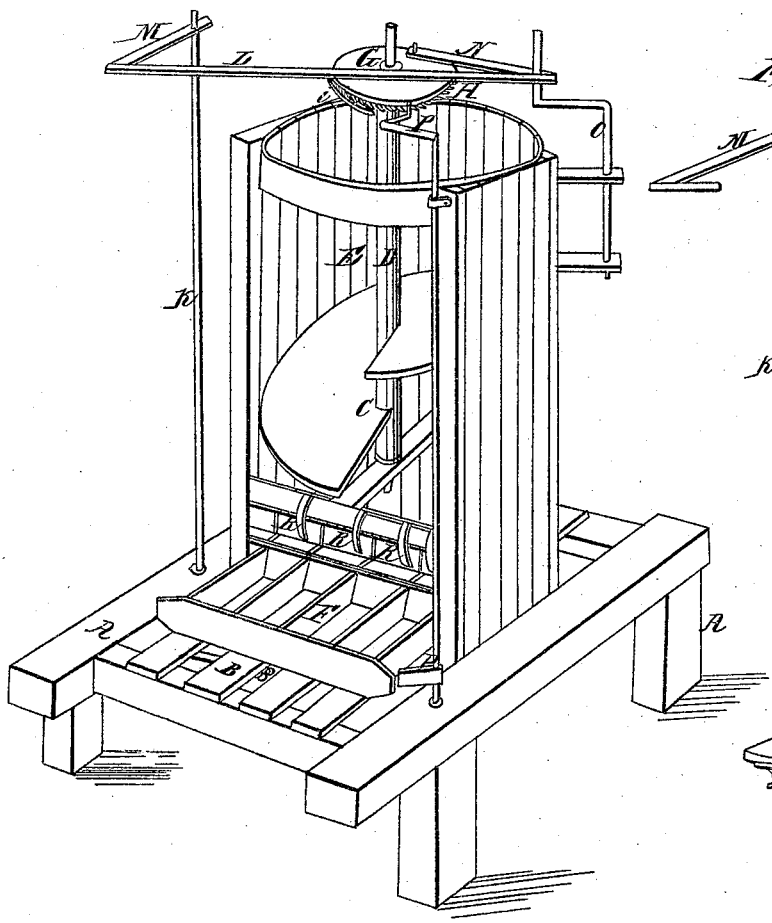
Fig: 1.
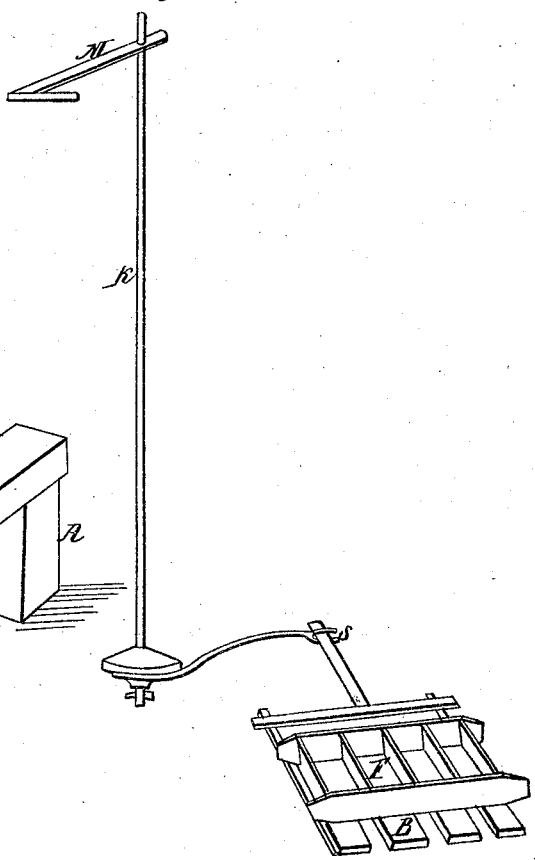
Fig: 2.

UNITED STATES PATENT OFFICE.

NATHANIEL ADAMS, OF CORNWALL, NEW YORK.

MACHINE FOR MOLDING AND PRESSING BRICKS.

Specification of Letters Patent No. 376, dated September 8, 1837.

*To all whom it may concern:*

Be it known that I, NATHANIEL ADAMS, of the town of Cornwall, county of Orange, and State of New York, have invented an Improved Machine for Molding Brick; and I do hereby declare that the following is a full and exact description thereof.

This machine consists first of a cylindrical clay box into which the clay is to be placed. Second a vertical shaft in the clay box upon which is a spiral inclined plane the operation of which when put in motion is to press the clay down into the molds with an equal pressure, the edge of the spiral plane and a knife operating also to cut and temper the clay when previously prepared in the ordinary way, and which with the addition of a sufficient number of knives on the vertical shaft would temper the clay as much as necessary without any previous preparation. The clay is pressed through a grating of the shape and a little less in size than the brick, the grating forming the bottom of the clay box under which the molds are placed to be filled.

The manner in which the vertical shaft operates and the contrivance for moving it will be seen by referring to the annexed drawing.

D is the shaft which revolves in the clay box, C, C, the spiral plane around the shaft, the clay is thrown in at the top of the box E, and by the pressure of the inclined plane is forced down between the bars or grating in the bottom of the box into the molds F. The shaft is moved by means of a loose wheel G, upon the upper end of the shaft and a ratchet wheel h which is fast to the shaft. The loose wheel is moved forward and backward by means of the shackle N, and by means of a dog i attached to the loose wheel which hooks into the ratchet wheel and is extracted at each half revolution, so that the shaft with the spiral revolves about half a revolution at a time which fills one mold. Another shackel L, is connected with the crank m, on the top of the vertical shaft k which is also represented by K Fig. 2 in the side drawing or section with a friction joint on the lower end of said shaft K. The use of said joint is to yield to a resistance that is more than necessary to move the molds and thereby avoid injury to the molds or machiney. To the end of the crank S, that forms a part of the aforesaid joint as marked in section or Fig. 2 a shackle is attached, extending to the rear of the clay box to the end of which a frame is fastened into which said frame the molds F, are placed and by it drawn from the rear of the clay box on the slides marked B on the main drawing and on the section or Fig. 2, passing under the clay box, the empty mold driving the full one out, and moving alternately with the vertical shaft in the clay box, stopping under the grating in the bottom of the clay box to be filled which is driven out by the next empty mold that is put on coming against it and then taken off in front of the machine. p p is the shaft of the regulator which is worked by the molds pressing against a leaf p in their passage out from under the clay box. Said leaf is attached to the shaft p, p, at the lower end, and the motion thus produced regulates a spring that hooks the dog by a leaf or ratchet at the upepr end of the shaft p, p. The use of said regulator being to prevent the dog from hooking before the mold arrives at the proper place to be filled. v, v are valves at the lower part of the clay box in front of the grating pressed against by springs which yield to a certain pressure and allow the valves to open whereby a passage is made for any hard substance that may have got mixed with the clay and avoid injury to the molds.

Other mechanical means in common use can be used to produce the motion of the vertical shafts herein described, those alluded to in the foregoing description are such as I have used to try the principle of this machine.

The principal advantage in this machine is the mode of pressure of the clay by an inclined plane as herein described into the molds by convenient machinery dispensing with hand labor also giving the brick greater solidity and strength and making them with great dispatch at the rate of from three to four thousand per hour.

I claim as my invention—

The combination of the parts of said machine in the manner above described or in any other manner substantially the same for the purposes aforesaid, but no one part separately or independently of this combination.

NATHL. ADAMS.

Witnesses:
T. M. SPARK,
W. H. JANSEN.